US011016583B2

(12) United States Patent
Robinson

(10) Patent No.: US 11,016,583 B2
(45) Date of Patent: May 25, 2021

(54) DIGITAL PEN TO ADJUST A 3D OBJECT

(71) Applicant: HEWLETT-PACKARD DEVELOPMENT COMPANY, L.P., Houston, TX (US)

(72) Inventor: Ian N. Robinson, Palo Alto, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/077,671

(22) PCT Filed: Feb. 6, 2017

(86) PCT No.: PCT/US2017/016697
§ 371 (c)(1),
(2) Date: Aug. 13, 2018

(87) PCT Pub. No.: WO2018/144034
PCT Pub. Date: Aug. 9, 2018

(65) Prior Publication Data
US 2019/0033993 A1 Jan. 31, 2019

(51) Int. Cl.
G06F 3/0354 (2013.01)
G06T 19/20 (2011.01)
(Continued)

(52) U.S. Cl.
CPC ........ G06F 3/03545 (2013.01); G06F 3/0346 (2013.01); G06T 19/20 (2013.01);
(Continued)

(58) Field of Classification Search
CPC .... G06F 3/03545; G06F 3/0346; G06F 3/041; G06T 19/20; G06T 2219/004; G06T 2219/2016
See application file for complete search history.

(56) References Cited

U.S. PATENT DOCUMENTS 5,526,022 A * 6/1996 Donahue .................. G01C 9/20
324/253
5,570,113 A * 10/1996 Zetts .................... G06F 3/04883
345/156
(Continued)

FOREIGN PATENT DOCUMENTS

EP        1353297 A2    10/2003
JP        H04245388 A    9/1992
(Continued)

OTHER PUBLICATIONS

Bi et al., "An Exploration of Pen Rolling for Pen-based Interactionm", Retrieved from Internet: http://www.moscovich.net/tomer/papers/bi-pen-rolling-uist2008.pdf, 2008, 10 pages.
(Continued)

Primary Examiner — Patrick N Edouard
Assistant Examiner — Joseph P Fox
(74) Attorney, Agent, or Firm — Fabian VanCott

(57) ABSTRACT

A digital pen may include an orientation sensors and a three-dimensional (3D) coordinate plane selection module wherein, via input from the orientation sensors describing a position and orientation of the digital pen with respect to a two-dimensional (2D) display, the 3D coordinate plane selection module selects at least one coordinate plane in which an element of a 3D image is to be adjusted.

20 Claims, 8 Drawing Sheets

(51) Int. Cl.
G06F 3/0346 (2013.01)
G06F 3/041 (2006.01)
(52) U.S. Cl.
CPC ........ G06F 3/041 (2013.01); G06T 2219/004 (2013.01); G06T 2219/2016 (2013.01)

(56) References Cited

U.S. PATENT DOCUMENTS

| | | | |
|---|---|---|---|
| 5,619,231 A | 4/1997 | Shouen | |
| 6,128,007 A | 10/2000 | Seybold | |
| 7,843,470 B2 | 11/2010 | Bannai et al. | |
| 9,075,464 B2 | 7/2015 | Mankowski et al. | |
| 9,195,351 B1 * | 11/2015 | Rosenberg | G06F 1/1626 |
| 9,201,568 B2 | 12/2015 | Chavez et al. | |
| 2004/0164956 A1 * | 8/2004 | Yamaguchi | G06F 3/04845 345/156 |
| 2013/0106723 A1 * | 5/2013 | Bakken | G06F 3/035 345/173 |
| 2015/0370350 A1 * | 12/2015 | Hunt | G06F 3/038 345/173 |
| 2016/0085359 A1 * | 3/2016 | Park | G06F 3/042 345/174 |

FOREIGN PATENT DOCUMENTS

| | | |
|---|---|---|
| WO | 2013153551 A1 | 10/2013 |
| WO | 2016200371 A1 | 12/2016 |

OTHER PUBLICATIONS

Tian et al., "Tilt Menu: Using the 3D Orientation Information of Pen Devices to Extend the Selection Capability of Pen-based User Interfaces", Retrieved from Internet: http://zhang.ist.psu.edu/pdf/paper239.pdf, Jan. 22, 2008, 10 pages.

Xin et al., "Acquiring and Pointing: An Empirical Study of Pen-Tilt-based Interaction", Retrieved from Internet: http://www.xiaojunbi.com/pdf/PenTilt.pdf, May 7-12, 2011, 10 pages.

* cited by examiner

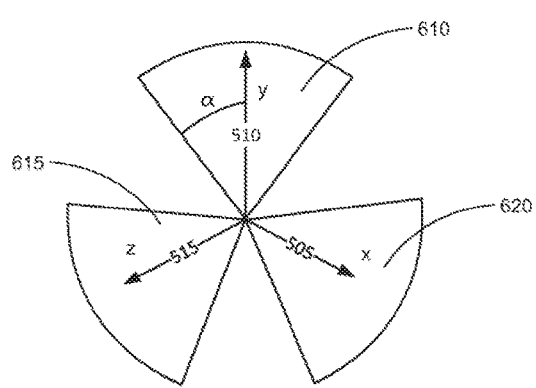 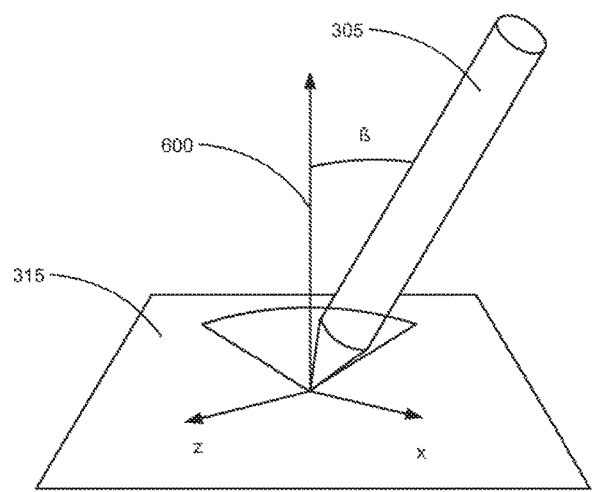
Fig. 6A　　　　Fig. 6B

DIGITAL PEN TO ADJUST A 3D OBJECT

BACKGROUND

Input devices communicatively coupled to computing devices provide for user interaction with applications running on the computing device. These input devices may be used to effect changes to objects displayed on a display device. The input devices may further be used to affect an action via the display device.

BRIEF DESCRIPTION OF THE DRAWINGS

The accompanying drawings illustrate various examples of the principles described herein and are a part of the specification. The illustrated examples are given merely for illustration, and do not limit the scope of the claims.

FIGS. 6A and 6B are a plan and perspective views respectively of a coordinate system describing the threshold degree tilt of the digital pen according to an example of the principles described herein.

Throughout the drawings, identical reference numbers designate similar, but not necessarily identical, elements.

DETAILED DESCRIPTION

Figure 1:
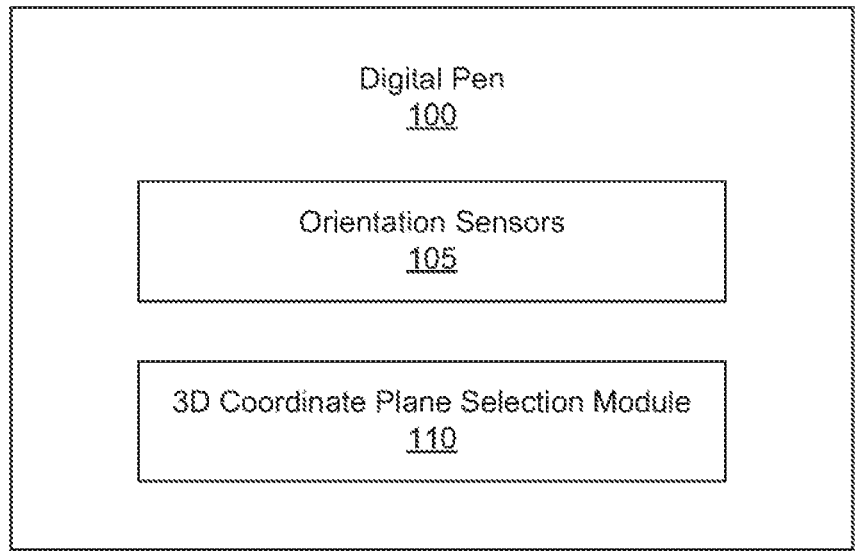
FIG. 1 is a block diagram of a digital pen according to an example of the principles described herein.

As described above, input devices are used to adjust objects presented to a user via a display device. Applications executed on a computing device associated with both the, above mentioned, input device and the display device may execute computer readable program code. The execution of that computer readable program code may present a user with, for example, the ability to create and move a three-dimensional (3D) object in 3D space. Creation, translation, and rotation of the 3D object in 3D space is done in some computing device programs such as computer-aided design (CAD) programs.

CAD programs rely on mouse input for object manipulation (i.e., translation and rotation) in the 3D space. There are two methods to translate those two-dimensional (2D) mouse motions into 3D object manipulations. The first method presents multiple viewports (together or one at a time) displaying the orthogonal view from the x, y and z directions (right, top, front elevations, respectively). However, with this method, mouse operations in any of those viewports are limited to the two dimensions displayed in that viewport. The second method includes changing the actions resulting from mouse movement by activating different modes, either by icon selection, clicking in the right location on a user interface (UI) icon, and/or by holding down some combination of mouse buttons and modifier keys on, for example, on a keyboard. However, this method either uses mouse buttons, which are a scarce resource in the user interface design, or implements the use of alternative buttons apart from those on the mouse adding to the operational complexity.

The present specification, therefore describes a digital pen that includes a number of orientation sensors and a three-dimensional (3D) coordinate plane selection module wherein, via input from the digital pen and orientation sensors describing a position and orientation of the digital pen with respect to a two-dimensional (2D) display, the 3D coordinate plane selection module selects a coordinate plane in which an element of a 3D image is to be adjusted.

The present specification further describes a method of manipulating a three-dimensionally represented object that includes receiving an indication that a digital pen has contacted a point on the two-dimensional (2D) screen where the three-dimensionally represented object is displayed, determining when a tilt of the digital pen is within a threshold degree of one of a number of axes of a coordinate space, and receiving instructions to adjust the three-dimensionally represented object.

The present specification further describes an input system that includes a digital pen including a number of orientation sensors, a 2D display device; and a three-dimensional (3D) coordinate plane selection module wherein the 3D coordinate plane selection module selects a coordinate plane in which an element of a 3D image is to be adjusted based on input from the digital pen and orientation sensors and wherein the input from the digital pen and orientation sensors describes a position and orientation of the digital pen with respect to the 2D display device and the 3D image.

As used in the present specification and in the appended claims, the term "digital pen" is meant to be understood as any device that is capable of providing positional data of itself with reference to a two-dimensional (2D) surface.

Additionally, as used in the present specification and in the appended claims, the term "a number of" or similar language is meant to be understood broadly as any positive number comprising 1 to infinity.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with that example is included as described, but may not be included in other examples.

Turning now to the figures, FIG. 1 is a block diagram of a digital pen (100) according to one example of the principles described herein. The digital pen (100) may be used to select and switch between different 3D planes defining a 3D object represented in 3D space. After the digital pen (100) has been used to select the 3D plane, the 3D object may be manipulated in that selected 3D plane using the pen on a 2D surface. Consequently, other input devices are not used in conjunction with the digital pen (100) in order to manipulate the 3D object. To accomplish the above, the digital pen (100) includes orientation sensors (105) and a three-dimensional (3D) coordinate plane selection module (110).

The digital pen (100) may be implemented in connection with any electronic device. Examples of electronic devices include servers, desktop computers, laptop computers, personal digital assistants (PDAs), mobile devices, smartphones, gaming systems, and tablets, among other electronic devices. In each of these examples, the digital pen (100) may serve as an input device communicatively coupled to at least a processing device included within the electronic device. For ease of understanding, the electronic device communicatively coupled to the digital pen (100) is a computing device. This is not meant to be a limitation on the description, however, and the present specification contemplates the use of any electronic device in connection with the digital pen (100).

The computing device and the digital pen (100) may be utilized in any data processing scenario including, stand-alone hardware, mobile applications, through a computing network, or combinations thereof. Further, the computing device may be used in a computing network, a public cloud network, a private cloud network, a hybrid cloud network, other forms of networks, or combinations thereof. The present systems may be implemented on one or multiple hardware platforms, in which the modules in the system can be executed on one or across multiple platforms. Such modules can run on various forms of cloud technologies and hybrid cloud technologies or offered as a SaaS (Software as a service) that can be implemented on or off the cloud. In another example, the methods provided by the computing device and digital pen (100) are executed by a local administrator.

To achieve its desired functionality, the computing device associated with the digital pen (100) comprises various hardware components. Among these hardware components may be a number of processors, a number of data storage devices, a number of peripheral device adapters, and a number of network adapters. These hardware components may be interconnected through the use of a number of busses and/or network connections. In one example, the processor, data storage device, peripheral device adapters, and a network adapter may be communicatively coupled via a bus.

The processor may include the hardware architecture to retrieve executable code from the data storage device and execute the executable code. The executable code may, when executed by the processor, cause the processor to implement at least the functionality of receiving an indication that a digital pen has contacted a point on the two-dimensional (2D) display device where the three-dimensionally represented object is displayed, determining when a tilt of the digital pen is within a threshold degree of one of a number of axes of a coordinate space corresponding to the three-dimensionally represented object, selecting an axis of coordinate space, and receiving instructions to adjust the three-dimensionally represented object according to the methods of the present specification described herein. In the course of executing code, the processor may receive input from and provide output to a number of the remaining hardware units. In an example, the computer readable program code describing the selection of an axis of coordinate space obtains information from a 3D application executing on the computing device associated with the digital pen (100). This information may include information relating to the current orientation of the coordinate axes in the displayed 3D workspace. As such, selection and manipulation of the element of a 3D object in the 3D workspace may be influenced by the current orientation of the coordinate axes at any given time.

The data storage device may store data such as executable program code that is executed by the processor or other processing device. As will be discussed, the data storage device may specifically store computer code representing a number of applications that the processor executes to implement at least the functionality described herein.

The data storage device may include various types of memory modules, including volatile and nonvolatile memory. For example, the data storage device of the present example includes Random Access Memory (RAM), Read Only Memory (ROM), and Hard Disk Drive (HDD) memory. Many other types of memory may also be utilized, and the present specification contemplates the use of many varying type(s) of memory in the data storage device as may suit a particular application of the principles described herein. In certain examples, different types of memory in the data storage device may be used for different data storage needs. For example, in certain examples the processor may boot from Read Only Memory (ROM), maintain nonvolatile storage in the Hard Disk Drive (HDD) memory, and execute program code stored in Random Access Memory (RAM).

Generally, the data storage device may comprise a computer readable medium, a computer readable storage medium, or a non-transitory computer readable medium, among others. For example, the data storage device may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device.

The hardware adapters in the computing device associated with the digital pen (100) enable the processor to interface with various other hardware elements, external and internal to the computing device. For example, the peripheral device adapters may provide an interface to input/output devices, such as, for example, display device, a mouse, or a keyboard. The peripheral device adapters may also provide access to other external devices such as an external storage device, a number of network devices such as, for example, servers, switches, and routers, client devices, other types of computing devices, and combinations thereof.

The display device may be provided to allow a user of the digital pen (100) to interact with and implement the functionality of the digital pen (100). The peripheral device adapters may also create an interface between the processor and the digital pen (100), the display device, a printer, or other media output devices. The network adapter may provide an interface to other computing devices within, for example, a network, thereby enabling the transmission of data between the computing device and other devices located within the network.

Computer readable program code may, when executed by the processor, display the number of graphical user interfaces (GUIs) on the display device representing a number of applications stored on the data storage device. The GUIs may be displayed on the display device to a user implementing the digital pen (100) such that the user may interact with the subject matter, such as the 3D object, presented on the display device. Examples of 2D display devices include a computer screen, a laptop screen, a mobile device screen, a personal digital assistant (PDA) screen, and a tablet screen, among other 20 display devices.

The computing device or the digital pen (100) may further comprise a number of modules used in the implementation of manipulating a three-dimensionally represented object on a 2D display device. The various modules comprise executable program code that may be executed separately. In this example, the various modules may be stored as separate computer program products either on the computing device or on a storage device within the digital pen (100). In another example, the various modules may be combined within a number of computer program products; each computer program product comprising a number of the modules.

The orientation sensors (105) may be any number of devices that measure, at least, the orientation of the digital pen (100). In an example, accelerometers and magnetometers can be used to determine the pen's orientation in relation to gravity and the Earth's magnetic field. In an example, the orientation of the pen may be determined using the pen's electro-magnetic positioning system, for example by measuring the location and signal strength at two positions along the body of the pen. In either example, the orientation sensors (105) provide data to the 3D coordinate plane selection module (110) describing, at least, the orientation of the digital pen (100) relative to the 2D display device. In an example, the digital pen (100) further provides data describing the position on the 2D display where the digital pen (100) has come in contact with the 2D display. This positional data along with the orientation data from the digital pen may be used by the orientation sensors to describe both the position and orientation of the digital pen with respect to the 2D display, the 3D workspace displayed to a user on the 2D display, or combinations thereof.

As will be described in more detail below, as the digital pen (100) comes in contact with a surface such as a 2D touchscreen device, digitizing tablet device or digitizing display device, the orientation sensors (105) may begin to provide data to the three-dimensional (3D) coordinate plane selection module (110) describing the orientation of the digital pen (100) relative to the device surface. In an example, this data describing the orientation of the digital pen (100) relative to the device surface as well as contact data from the device surface describing the position of the digital pen (100) on the surface may be used by the 3D coordinate plane selection module (110).

The 3D coordinate plane selection module (110) may be any module that receives data from, at least, the orientation sensors (105) and determines the orientation of the digital pen (100) and, optionally, the position of the digital pen (100) as it relates to the displayed 3D application environment on the 2D display device. In an example, the 3D coordinate plane selection module (110) is in the form of computer readable program code that, when executed by a processor either on a computing device or on the digital pen (100), determines the orientation of the digital pen (100) with respect to the 3D workspace as displayed to the user on the 2D display device. In an example, the 3D coordinate plane selection module (110) is in the form of an application-specific integrated circuit (ASIC) that receives the data from the orientation sensors (105) and performs those functions described herein. In either example, after the 3D coordinate plane selection module (110) has determined the orientation and, optionally, the position of the digital pen (100) relative to the surface of the 2D display device, the data describing the orientation and, optionally, the position of the digital pen (100) may be provided to a computing device executing, for example, the 3D application environment. Thus, such data may be used to allow a user to interface with, at least, an element of a 3D object represented on the 2D display device associated with the digital pen (100) and computing device. Thus, the digital pen (100) is used to select a coordinate plane in the 3D workspace displayed on the two-dimensional (2D) display device and allows the user to adjust the position and/or orientation of, at least, a selected element within that 3D workspace.

Figure 2:
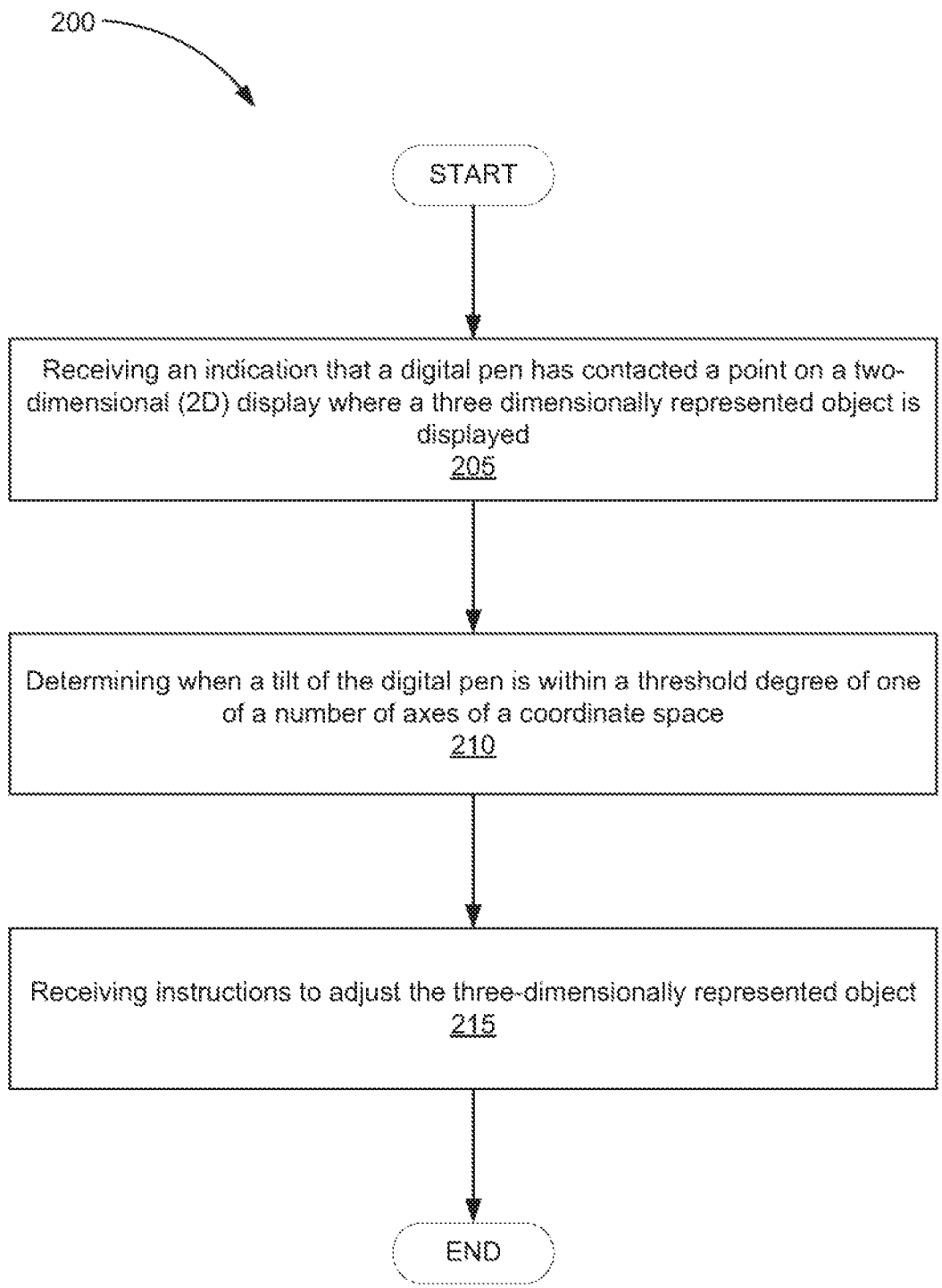
FIG. 2 is a flowchart showing a method of manipulating a three-dimensionally represented object according to an example of the principles described herein.

In an example, the 2D display device may be a touchscreen on a computing device or a touchscreen on a tablet device. In this example, the user may contact the touchscreen with the digital pen (100) in order to interface with the 3D object or image represented on the touchscreen at that location of contact. FIG. 2 is a flowchart showing a method (200) of manipulating a three-dimensionally represented object according to an example of the principles described herein. The method (200) may begin with receiving (205) an indication that a digital pen has contacted a point on a 20 screen where a three dimensionally represented object is represented. In an example, the indication may be in the form of a digital signal from the 2D display device indicating that the digital pen (100) has contacted a point on the surface of the 2D display device. The 2D coordinate location of the touch by the digital pen (100) may be sent to the processor of the computing device or tablet device.

The method (200) may continue by determining (210) when a tilt of the digital pen (FIG. 1, 100) is within a threshold degree of one of a number of axes of a coordinate space. As described above, the orientation sensors (FIG. 1, 105) provides data to, for example, the processor of the computing device or tablet device describing the orientation of the digital pen (100) with regard to the surface of the 2D display device. When the orientation of the digital pen (100) has been determined, that data may be used to determine (210) if the tilt of the digital pen (FIG. 1, 100) places the digital pen (FIG. 1, 100) within a threshold distance from one of an x coordinate axis, a y coordinate place, and a z coordinate axis. Where the tilt of the digital pen (FIG. 1, 100) does fall within a threshold distance from one of the axes of the coordinate space, the coordinate plane perpendicular to that axis is deemed to be selected by the user.

In an example, the position of the digital pen (100) is also used in the determination of the directions of the coordinate axes. For example, if the displayed 3D workspace has an exaggerated perspective, then the coordinate axes for a 3D object on a far-left area of the 2D display will point in different directions from those for an object on a far-right area of the 2D display. Alternatively, the present systems and method may determine a single set of axis directions (e.g. from viewpoint orientation) which the system may then use to compare to a tilt of the digital pen (100) irrespective of the digital pen's (100) location. Another example described in connection with FIG. 6, may include axes that are mapped to, for example, 12 o'clock, 4 o'clock, and 8 o'clock irrespective of how they are displayed in the scene. In this example, plane selection is performed by the digital pen (100) without input from the 3D application executed by the computing device.

The method may also include receiving (215) instructions to adjust the three-dimensionally represented object. Here, because an axis of a coordinate space has been selected based on the tilt of the digital pen (FIG. 1, 100), the user may translate and/or rotate the digital pen (FIG. 1, 100) such that it effects the position of the 3D object represented on the 2D display device of the computing device or tablet device. In an example, the user may be provided with possible adjustment indicators provided in connection with the 3D object. The adjustment indicators may be displayed on the display device that indicate how the user can adjust the 3D object based on the axis of coordinate space currently being selected. This may provide the user with the knowledge of how the 3D object may be manipulated as well as an indication of the axis of coordinate space currently selected.

In an example, the axis of coordinate space may be switched by tilting the digital pen (FIG. 1, 100) to be within a threshold degree of another axis of the coordinate space. In this example, the user can accomplish this switch by adjusting the tilt of the digital pen (FIG. 1, 100) while the digital pen (FIG. 1, 100) remains in contact with the surface of the 2D display device described above. In an example, the user can accomplish this switch by removing the digital pen (FIG. 1, 100) from the surface of the 2D display device, realigning the tilt of the digital pen (FIG. 1, 100) to fit within a threshold degree of another axis in the coordinate space, and making contact with the touchscreen using the digital pen (FIG. 1, 100) again.

Figure 3:
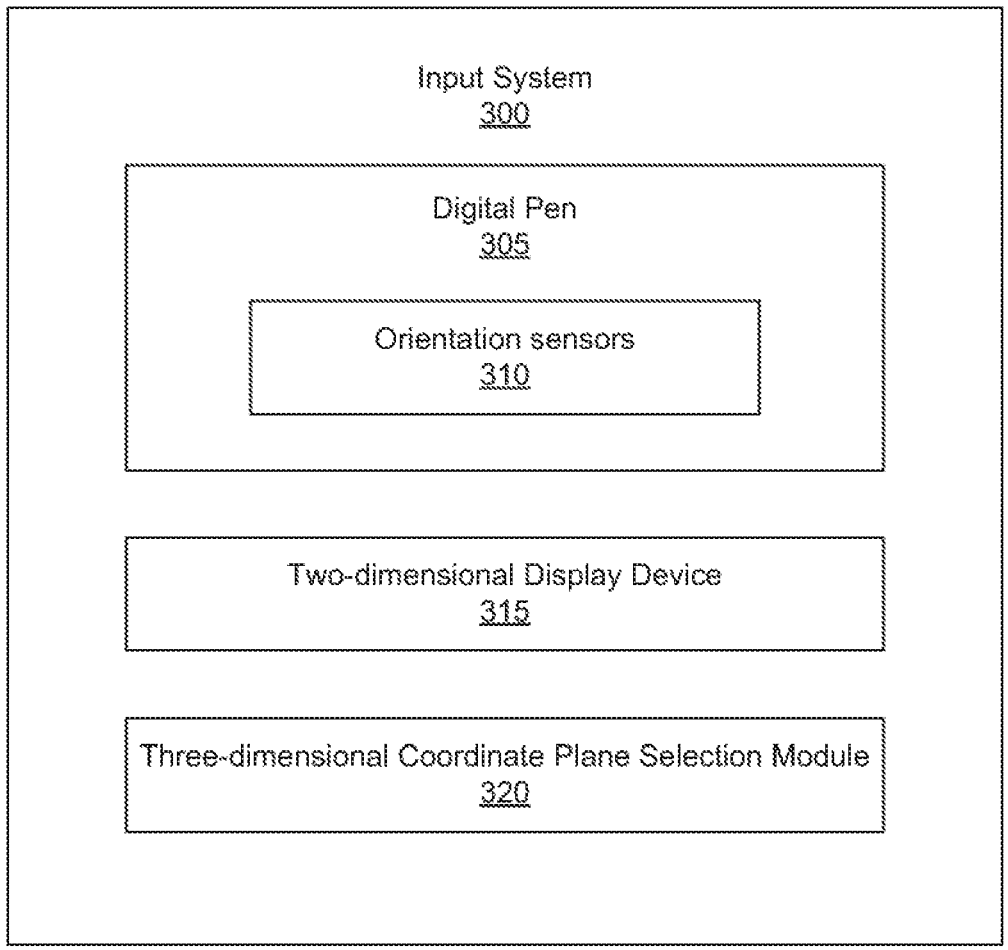
FIG. 3 is a block diagram of an input system according to an example of the principles described herein.

FIG. 3 is a block diagram of an input system (300) according to an example of the principles described herein. Some aspects of the digital pen (305) described above in connection with FIGS. 1 and 2 may be included in the input system (300) of FIG. 3. The input system (300) may include a digital pen (305) with its orientation sensors (310), a two-dimensional (2D) display device (315), and a 3D coordinate plane selection module (320).

The digital pen (305) and its orientation sensors (310) have been described above in connection with FIG. 1. The digital pen may be, for example, any stylus-type device that can be held by a user similar to a pencil or pen. As described herein, the digital pen (305) includes orientation sensors (310) that can detect the orientation of the digital pen (305) relative to the 2D display device (315).

The 2D display device (315) may be any device that can receive input from the digital pen (305) as the digital pen comes in contact with a surface of the 2D display device (315). The 2D display device (315) may implement any resistive, capacitive, infrared, optical imaging, acoustic apparatus or device, or any suitable combination of the foregoing, to detect the touch of the digital pen (305) on the surface of the 2D display device (315).

The 3D coordinates plane selection module (320) may implement any form of computer readable program code executed by a processor or be implemented as a ASIC in order to determine the orientation of the digital pen (100) in physical 3D space relative to the touch pad or 2D display device (315). In the example where the 3D coordinate plane selection module (320) is embodied as computer readable program code, a processor on either the digital pen (305) or on a computing device associated with the digital pen (305) and 2D display device (315) may execute that computer readable program code. This is done to accomplish the methods and tasks of the 3D coordinate plane selection module (320) described herein.

In an example, the input system (300) is a tablet device that incorporates the 2D display device (315) and 3D coordinates plane selection module (320) therein. During operation of the tablet device, a user may interact with the surface of the 2D display device (315) directly using the digital pen (305). Thus, a user may manipulate a 3D object represented on the 2D display device (315) using a 2D surface.

In an example, the input system (300) may include a touch pad and a display device. In this example, the features of the 2D display device (315) described above are separated into two devices: a pad to interact with the digital pen (305) and the display device, separate from the pad, to display the 3D object and represent those manipulations to the 3D object as directed by the user implementing the digital pen (305). In this example, the position of the digital pen (305) may be mapped to fit the orientation of the display device relative to the pad. Here, a user can indicate that the pad is laying horizontally on, for example, the top of a desk while the display device is positioned vertically like a computer screen. This allows the user to orient the tilt of the digital pen (305) with respect to the horizontal surface such that a coordinate axis displayed on the vertical screen may be selected. In order to assist the user in selecting an axis of the coordinate plane, the display device may show, in shadow for example, a representation of the digital pen (305). This may allow the user to adjust the tilt of the digital pen (305) in order to better select the axis of the coordinate plane.

Figure 4:
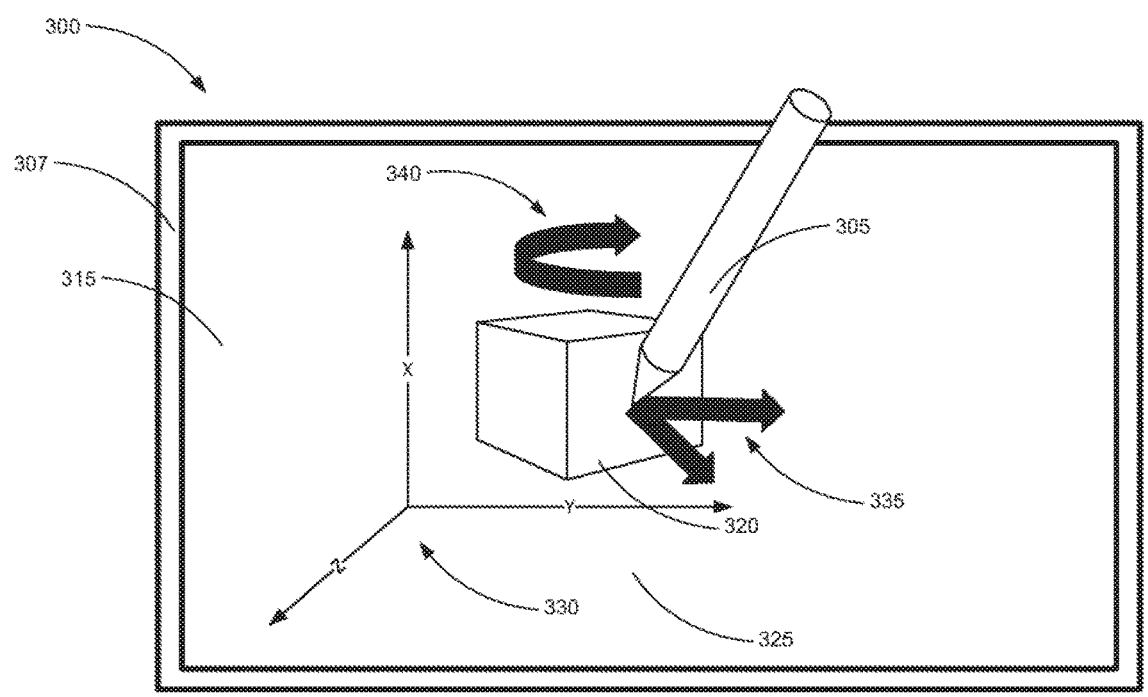
FIG. 4 is a top plan view of the input system of FIG. 3 according to an example of the principles described herein.

FIG. 4 is a top plan view of the input system (300) of FIG. 3 according to an example of the principles described herein. In this example, the input system (300) is a tablet device (307) including a 2D display device (315). The 2D display device (315) has a 2D surface on which a user may interact with using the digital pen (305) as described above. During operation, the user may cause the digital pen (305) to come in contact with the 2D display device (315) at a location of a 3D object (320) represented in 3D space (325) on the 2D display device (315). In this example, the orientation of the 3D space (325) may be determined via a 3D coordinate legend (330) displayed on the 2D display device (315). This may allow a user to be able to visually orient the 3D object (320) within the 3D space (325). Additionally, the image displayed on the 2D display device (315) of the tablet device (307) may include a number of modification indicators (335, 340) indicating the ways in which a user may drag a tip of the digital pen (305) across the 2D display device (315) or rotate the digital pen (305) in order to adjust the position of the 3D object (320). In an example a rotation modification indicator (340) is presented to a user when the user touches the position on the 2D display device (315) where the 3D object (320) is represented. This designates to a user how the 3D object (320) may be rotated when the user twists the digital pen (305). In an example, a translation modification indicator (355) may be presented to a user indicating how the 3D object (320) may be translated within the 3D space (325). In each of these examples of modification indicators (335, 340), the presented modification indicators (335, 340) may change based on the coordinate axis selected by the user.

Figure 5A:
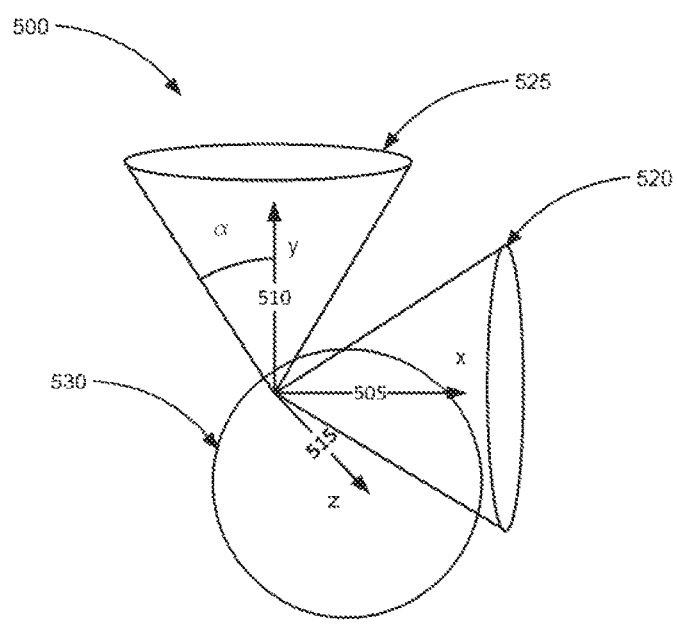
FIGS. 5A and 5B are perspective views of a coordinate system describing the threshold degree tilt of the digital pen according to an example of the principles described herein.
Figure 5B:
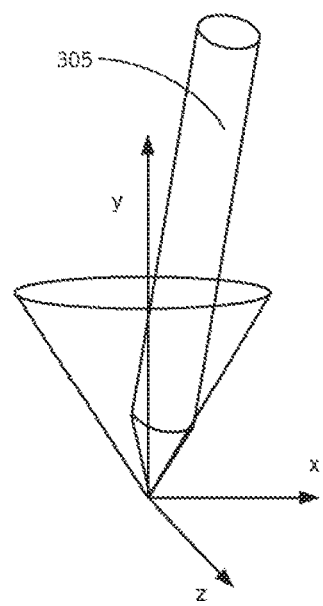

FIGS. 5A and 5B are perspective views of a coordinate system (500) describing the threshold degree (a) tilt of the digital pen according to an example of the principles described herein. The coordinate system (500), in an example, may include an x-axis (505), a y-axis (510), and a z-axis (515) representing the three Cartesian coordinates. Each of these axes have a cone shaped area (520, 525, 530) defined about them representing that area where the digital pen (305) may be tilted to select that plane. Each of the cone shaped areas (520, 525, 530) boundaries are defined by the vertex of the coordinate system (500) and the threshold degree (a). The tip of the cone shaped area (520, 525, 530) originates at the origin of the coordinate system (500) while the sides of the cone shaped area (520, 525, 530) project out from each axis.

Because the 3D coordinate planes are being represented on the 2D plane of the 2D display device (315), a portion of at least one cone shaped area (520, 525, 530) falls in or behind the 2D surface. In the example show in FIG. 5A, the z-axis (515) may come out of the surface of the 2D display device (315). The user may select the z-axis (515) by holding the digital pen (305) perpendicular to the surface of the 2D display device (315). In the example show in FIG. 5A, the x-axis (505) and y-axis (510) may each be halved by the surface of the 2D display device (315) such that half of the cone shaped areas (520, 525) fall behind the 2D display device (315) while the other half extends out of the surface of the 2D display device (315). To select these axes (505, 510) a user may tilt the digital pen (305) such that it falls within either of those halved cone shaped areas (520, 525). Other spatial arrangements of the cone shaped areas (520, 525, 530) can exist and the present specification contemplates those arrangements.

In the example of FIGS. 5A and 5B, the outward angle of the sides of the cone shaped areas (520, 525, 530) are defined by the threshold degree (a). In an example, the threshold degree (a) may be between 0° and 45°. In an example, the threshold degree (a) may be between 0° and 35°. In an example, the threshold degree (a) may be between 0° and 25°. In an example, the threshold degree (a) may be between 0° and 150. In an example, the threshold degree (a) may be between 0° and 5°.

In the examples above, when a digital pen (305) is oriented in real space by the user so that the tilt of the digital pen (305) falls within the cone shaped area (520, 525, 530) defined by the threshold degree (a), that specific axis is chosen and the related coordinate plane is selected. In an example, the selected coordinate plane is chosen after the digital pen (305) has contacted the 2D display device (315). In this example, the point of contact of the digital pen (305) on the 2D display device (315) is the point where the tip of the cone shaped area (520, 525, 530) is defined. In an example, after the digital pen (305) has contacted the 2D display device (315), a user may tilt the digital pen (305) such that a specific axis (505, 510, 515) is unselected. This is done by tilting the digital pen (305) outside of the threshold degree (a) defined around that specific axis (505, 510, 515). The user may tilt the digital pen (305) further such that another axis (505, 510, 515) is selected. This is done by tilting the digital pen (305) such that it falls within the cone shaped area (520, 525, 530) defined around the other axis (505, 510, 515). This option may be seen as an advanced user option because the user may select a different coordinate plane without lifting the digital pen (305) from off the 2D display device (315).

In an example, a user may select a different axis (505, 510, 515), by lifting the digital pen (305) from off of the 2D display device (315), tilting the digital pen (305) in real space so that it falls within a second cone shaped area (520, 525, 530) or at least out of a first cone shaped area (520, 525, 530), and reapplying the digital pen (305) to the surface of the 2D display device (315). This option may be seen as a novice user option because the user may not be allowed to switch from one chosen axis (505, 510, 515) to another without first lifting the digital pen (FIG. 1, 100) from off the 2D display device (315). In an example, the user may select or toggle between the above described advanced user option and the novice user option via selection of a button on the user interface presented on the 2D display device (315).

FIGS. 6A and 6B are perspective views of a coordinate system describing the threshold degree tilt of the digital pen according to an example of the principles described herein.

In this example, the determination as to which coordinate axis (505, 510, 515) is selected depends on two thresholds: a first threshold degree (α) and a second threshold degree (α). This is done by monitoring whether the digital pen (305) is tilted away from vertical (600) at least by the second threshold degree (ß). When the digital pen (305) is tilted beyond the second threshold degree (ß), it is then determined which section (610, 615, 620) around the vertex of the coordinate system the digital pen (305) is tilted towards. Thus, when the digital pen (305) is tilted more than β degrees from vertical, and if its tilt direction is within a degrees of any of these axes (505, 510, 515), then that axis is selected.

Figure 7:
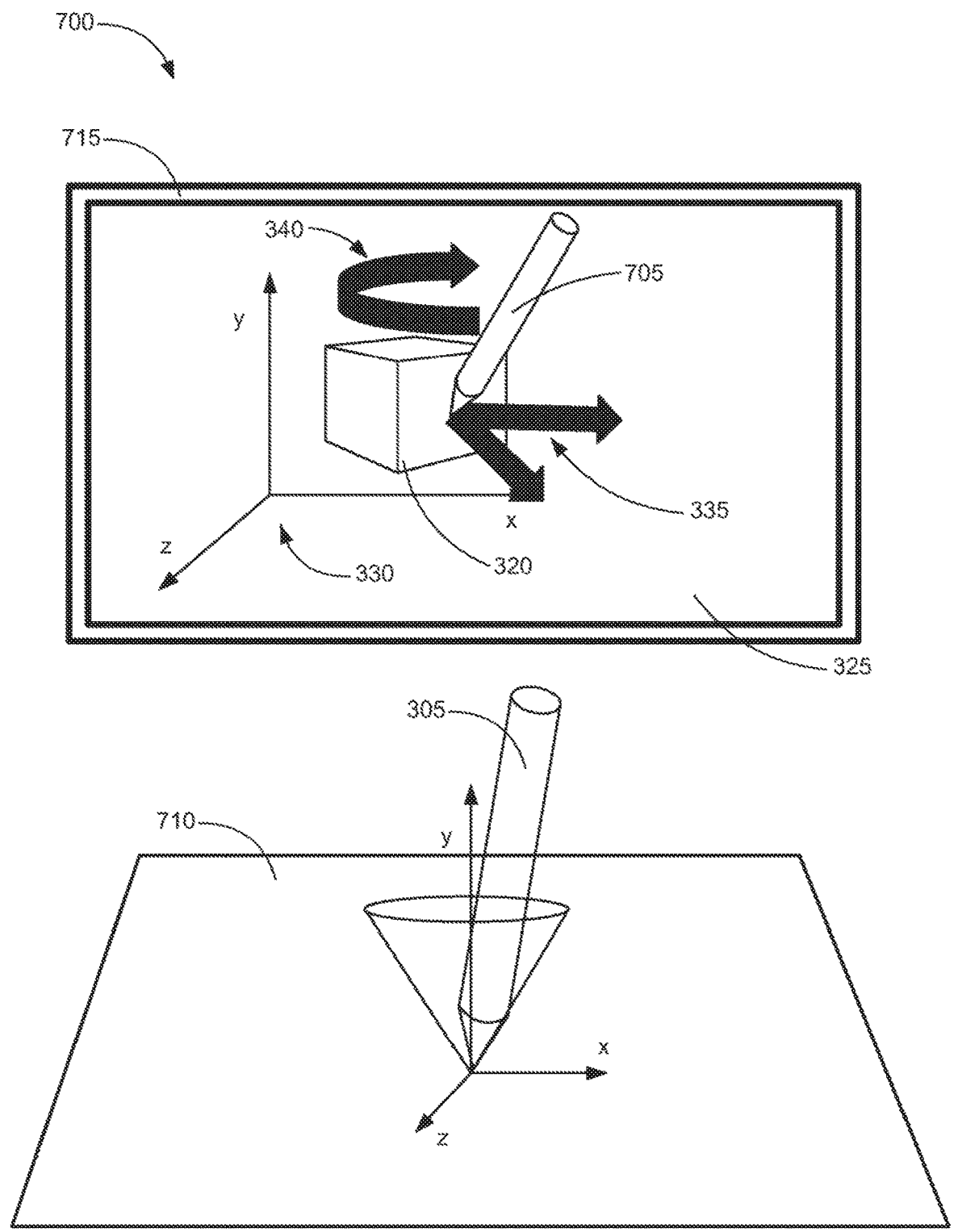
FIG. 7 is front perspective diagram of an input system according to an example of the principles described herein.

FIG. 7 is front elevational diagram of an input system (700) according to an example of the principles described herein. The system (700) may include many of those features as described in connection with FIG. 3. However, in the example of FIG. 7, the features of the 2D display device (315) described above are separated into two devices: the touch pad (710) to interact with the digital pen (305) and the display device (715), separate from the touch pad, to display the 3D object (320) and represent those manipulations to the 3D object (320) as directed by the user implementing the digital pen (305). In this example, the position of the digital pen (305) may be mapped to fit the orientation of the display device relative to the touch pad (710). Here, a user can indicate that the touch pad is laying horizontally on, for example, the top of a desk while the display device is positioned vertically like a computer screen. This allows the user to orient the tilt of the digital pen (305) such that a coordinate axis displayed on the vertical screen may be selected. In order to assist the user in selecting an axis of the coordinate plane, the display device may show, in shadow for example, a representation of the digital pen (305). This may allow the user to adjust the tilt of the digital pen (305) in order to better select the axis of the coordinate plane.

Figure 8:
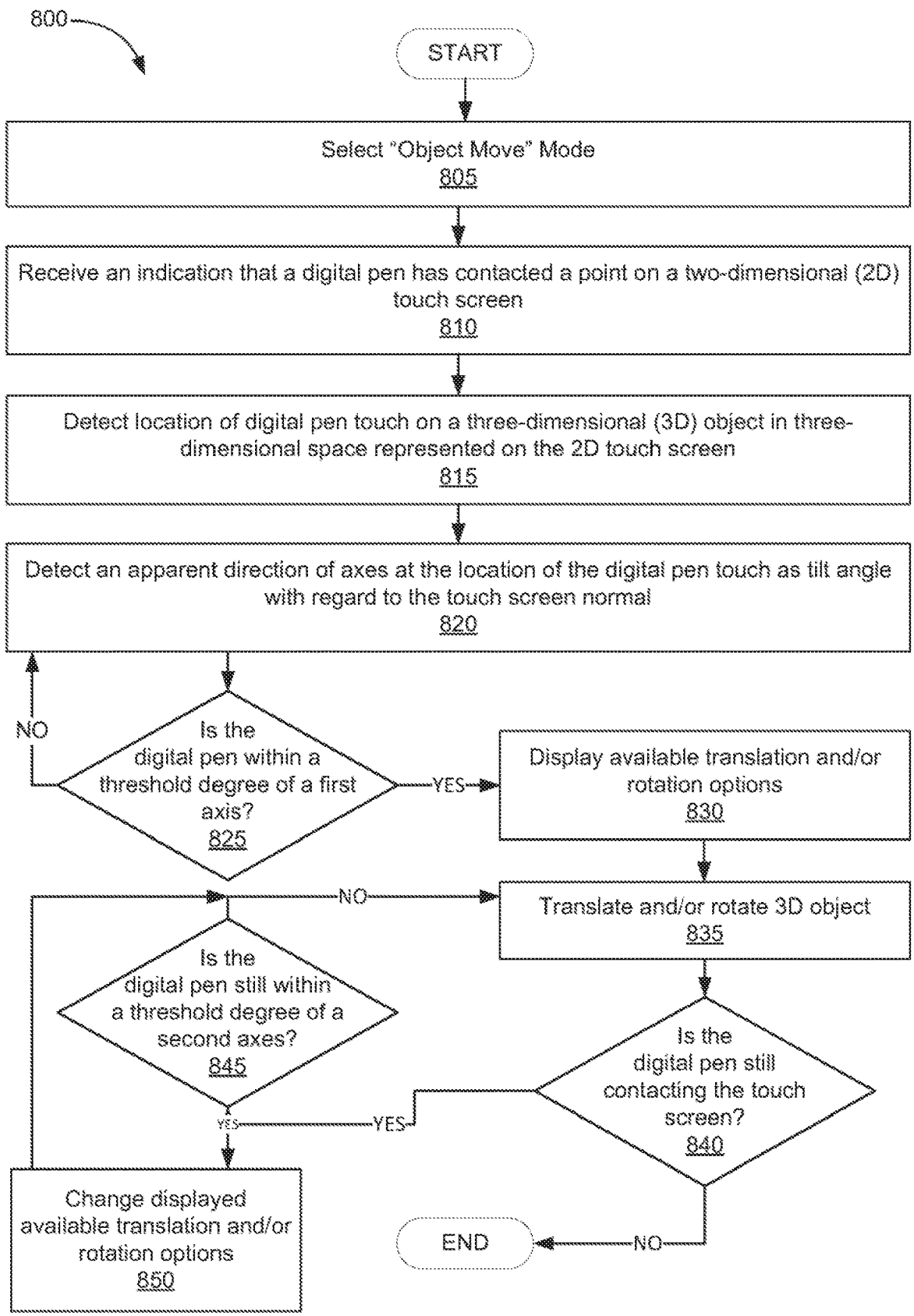
FIG. 8 is a flowchart showing a method of manipulating a three-dimensionally represented object according to an example of the principles described herein.

FIG. 8 is a flowchart showing a method (800) of manipulating a three-dimensionally represented object according to an example of the principles described herein. The method (800) may begin with selecting an object move mode on the user interface presented to the user on, for example, the 2D display device (315). The selection of the object move mode causes the digital pen (305) to be used for moving of the 3D object (320) as apart from adding lines or otherwise drawing on the 3D space (325). However, other modes may be used in connection with the digital pen and system described herein and the present specification contemplates the use of the digital pen and system to, for example, place marks on the 3D object (320), change marks defining a part of the 3D object (320), or other actions available in CAD-type drawing programs.

The method (800) may include receiving (810) an indication that a digital pen (305) has contacted a point on a 2D touchscreen of, for example, a 2D display device (315). Again, this indication may be received from the touchscreen itself or may be generated via a combination of the touchscreen and the digital pen (305).

The method (800) may further include detecting a location of a digital pen (305) touch on a three-dimensional (3D) object in three-dimensional space represented on the 2D touchscreen. Here the indication where the digital pen (305) contacts the 2D touchscreen may be mapped to determine what portion of which 3D object (320) is being touched.

The method (800) further includes detecting an apparent direction of axes at the location of the digital pen touch as tilt angle with regard to the touchscreen. As described above, a threshold degree or a number of threshold degrees may be used to determine the tilt of the digital pen (305) relative to the surface of the 2D display device (315). The method (800) further determines whether the digital pen (305) is within a threshold degree of a first axis (Decision, 825). The method (800) includes constantly monitoring the tilt of the digital pen (305) using the orientation sensors (FIG. 1, 105) (Decision NO, 825) until it detects that the digital pen (305) is within a threshold degree of a first axis (Decision YES, 825).

The method (800) provides a user with a display (830) of any available translation and/or rotation options or modification indicators (335, 340) associated with the 3D object (320). The method (800) then receives signals to translate and/or rotate (835) the 3D object (320).

The method (800) may also constantly detect whether the digital pen (305) is still contacting the touchscreen (Decision, 840). As long as the digital pen (305) is still contacting the touchscreen (Decision, YES 840), the displayed (850) available translation and/or rotation options are maintained and input to translate and/or rotate (835) the 3D object (320) is monitored. If the digital pen (305) is no longer contacting the touchscreen (Decision No, 840) the process may stop and the touchscreen device (315) may continue to monitor for a contact between the touchscreen device (315) and the digital pen (305).

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general-purpose computer, special purpose computer, or other programmable data processing apparatus to produce a machine, such that the computer usable program code, when executed via, for example, a processor of the computing device and/or digital pen or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe a digital pen and method of manipulating a 3D object represented on a 2D surface using the digital pen. The pen and method described herein does not include any added complication and screen real-estate of multiple viewports, nor the complication and extra process of mode switches. Instead, the way the digital pen is held and moved relates intuitively to 3D object manipulation. This digital pen and method does not include the use of separate buttons or devices to select a coordinate plane in which a selected three-dimensionally represented image displayed on a two-dimensional (2D) display device should be adjusted. This may save the user on costs and downtime used to learn how to manipulate the 3D object.

The preceding description has been presented to illustrate and describe examples of the principles described. This description is not intended to be exhaustive or to limit these principles to any precise form disclosed. Many modifications and variations are possible in light of the above teaching.

What is claimed is:

1. A digital pen, comprising:
   a number of orientation sensors; and
   a three-dimensional (3D) coordinate plane selection module;
   wherein, via input from the digital pen and orientation sensors describing a position and orientation of the digital pen with respect to a two-dimensional (2D) display, the 3D coordinate plane selection module selects a coordinate plane in which an element of a 3D image is to be adjusted.

2. The digital pen of claim 1, wherein a first coordinate plane is selected when the digital pen is within a first threshold degree of the first coordinate plane.

3. The digital pen of claim 2, where a second coordinate plane is selected when the digital pen is moved out of the first threshold degree and into a second threshold degree associated with the second coordinate plane.

4. The digital pen of claim 3, wherein a space is created between the first and second threshold degrees where no coordinate plane may be selected.

5. The digital pen of claim 2, wherein each axis of the coordinate plane comprises a threshold degree that is in the shape of a cone about each coordinate axis originating from the current pen location.

6. The digital pen of claim 5, wherein the cone has a tip corresponding to a point of contact between the digital pen and the 2D display.

7. The digital pen of claim 1, wherein each axis of the coordinate plane corresponds to a second threshold degree that selects a coordinate plane when the digital pen is tilted past a first threshold degree from perpendicular on the 2D display device.

8. The digital pen of claim 1, wherein contact of the digital pen on a horizontal pad is mapped to the 2D display device arranged vertically and wherein an arrangement of the coordinate plane is maintained between the pad and the 2D display device.

9. The digital pen of claim 1, wherein the number of orientation sensors comprises an electro-magnetic positioning system to measure a location and signal strength at two positions along a body of the digital pen.

10. The digital pen of claim 1, wherein moving the digital pen moves the 3D image.

11. A method of manipulating a three-dimensionally represented object, comprising:
    receiving an indication that a digital pen has contacted a point on a two-dimensional (2D) display where the three-dimensionally represented object is displayed;
    determining when a tilt of the digital pen is within a threshold degree of one of a number of axes of a coordinate space;
    selecting a coordinate plane in which an element of the three-dimensionally represented object is to be adjusted based on the tilt of the digital plane being within the threshold degree of an axis of the coordinate space; and
    receiving instructions to adjust the three-dimensionally represented object.

12. The method of claim 11, further comprising displaying on the 2D display an indication of how the three-dimensionally represented object can be adjusted using the digital pen.

13. The method of claim 12, wherein the adjustment of the three-dimensionally represented object comprises moving the three-dimensionally represented object within a three-dimensionally represented space; marking the three-dimensionally represented object; and rotating the three-dimensionally represented object.

14. The method of claim 11, wherein determining when a tilt of the digital pen is within a threshold degree of one of a number of axes of a coordinate space comprises determining whether the digital pen is present within a threshold degree that is in the shape of a cone with a tip of the cone originating at the origin of each of the axes of the coordinate space defined at the point of contact between the digital pen and 2D display.

15. The method of claim 11, wherein adjustment of the three-dimensionally represented object is stopped when the digital pen is lifted from off the 2D display.

16. The method of claim 11, wherein selection of a coordinate plane is done without input from a 3D application executed on a computing device.

17. The method of claim 11, further comprising rotating the digital pen to effectuate a rotation of the three-dimensionally represented object.

18. An input system, comprising:
- a digital pen comprising a number of orientation sensors;
- a two-dimensional (2D) display device; and
- a three-dimensional (3D) coordinate plane selection module to:
  - based on an output from the orientation sensors, select a coordinate plane in which an element of a 3D image is to be adjusted responsive to the output which describes a position and orientation of the digital pen with respect to the 2D display device and the 3D image; and
  - based on the output from the orientation sensors indicating a tilt of the digital pen is outside of a threshold degree about an axis in the coordinate plane:
    - de-selects the coordinate plane; and
    - selects another coordinate plane, wherein the tilt of the digital pen changes while the digital pen remains in contact with the 2D display device.

19. The input system of claim 18, wherein a coordinate plane is selected when the digital pen is within a first threshold degree of the coordinate axis perpendicular to that plane.

20. The input system of claim 18, wherein the threshold degree about each coordinate axis describes the shape of a cone with a tip of the cone originating at the origin of each of the coordinate axes.

* * * * *